United States Patent
Fuller et al.

(10) Patent No.: US 6,933,441 B2
(45) Date of Patent: Aug. 23, 2005

(54) FIBER OPTIC CABLE ENCLOSURE

(76) Inventors: Denise E. Fuller, 382 Rue De Larouge, Sparks, NV (US) 89434; Richard D. Voliva, 13998 Pauls Pl., Grass Valley, CA (US) 95945

( * ) Notice: Subject to any disclaimer, the term of this patent is extended or adjusted under 35 U.S.C. 154(b) by 0 days.

(21) Appl. No.: 10/714,038

(22) Filed: Nov. 14, 2003

(65) Prior Publication Data

US 2005/0103515 A1     May 19, 2005

(51) Int. Cl.[7] .............................................. H02G 3/08
(52) U.S. Cl. ......................... 174/50; 174/64; 174/58; 174/135; 312/223.6
(58) Field of Search ........................... 174/50, 135, 64, 174/65 R, 58, 60; 385/134, 135, 137; 312/223.6, 312/296, 223.1

(56) References Cited

U.S. PATENT DOCUMENTS

| | | | |
|---|---|---|---|
| 5,272,279 A | * | 12/1993 | Filshie ........................ 174/50 |
| 5,546,495 A | * | 8/1996 | Bruckner et al. ............ 385/135 |
| 5,745,633 A | * | 4/1998 | Giebel et al. ................ 385/136 |
| 5,933,563 A | * | 8/1999 | Schaffer et al. ............. 385/135 |
| 6,201,920 B1 | * | 3/2001 | Noble et al. ................. 385/134 |
| 6,515,227 B1 | * | 2/2003 | Massey et al. ................ 174/50 |

* cited by examiner

*Primary Examiner*—Dhiru R. Patel
(74) *Attorney, Agent, or Firm*—Bruce & McCoy; Ernest H. McCoy

(57) ABSTRACT

A fiber optic cable enclosure having a rectangular box with a sliding cover and containing a cable reel disposed and supported therein on protuberances projecting from the bottom of the reel with the side panels of the enclosure supported in C section channels for horizontal sliding intermittent reciprocating motion whereby a cable wound on said reel can be extracted and utilized as a jumper cable for establishing emergency connections in a telecommunications network.

8 Claims, 4 Drawing Sheets

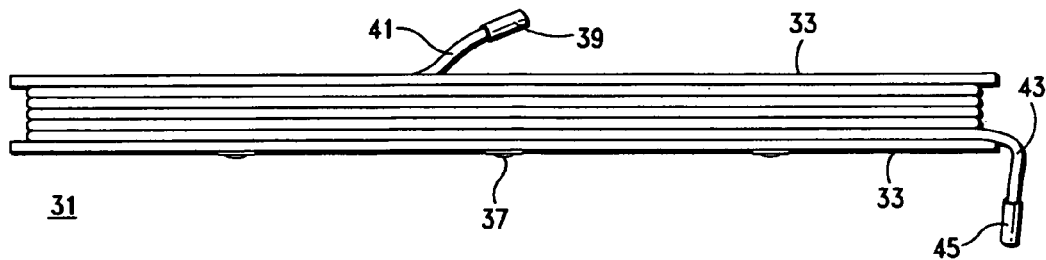
FIG.—4
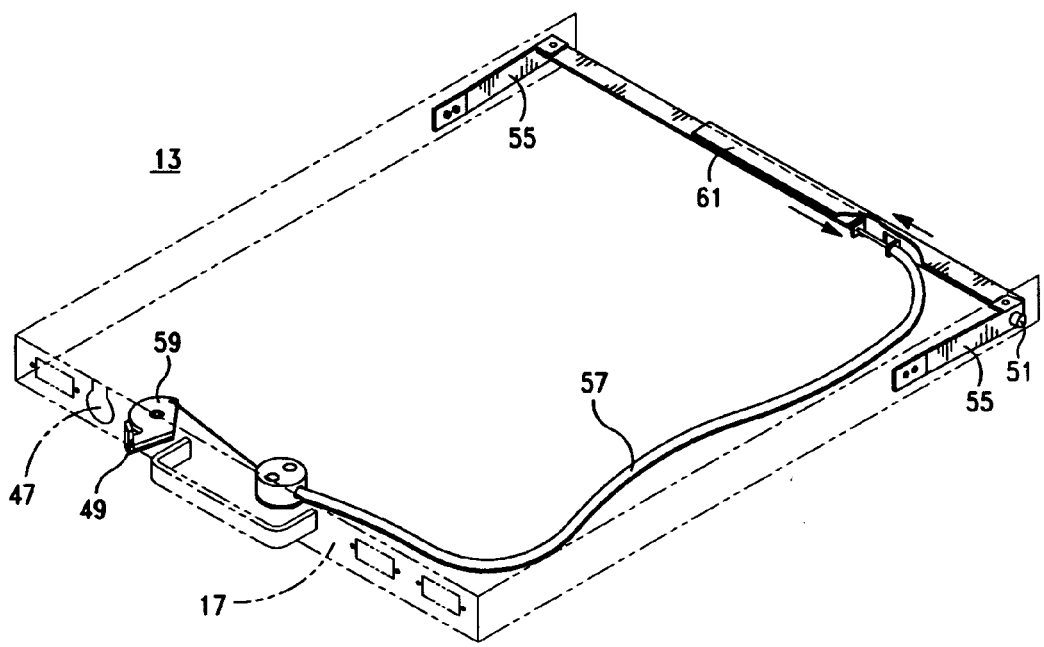
FIG.—5

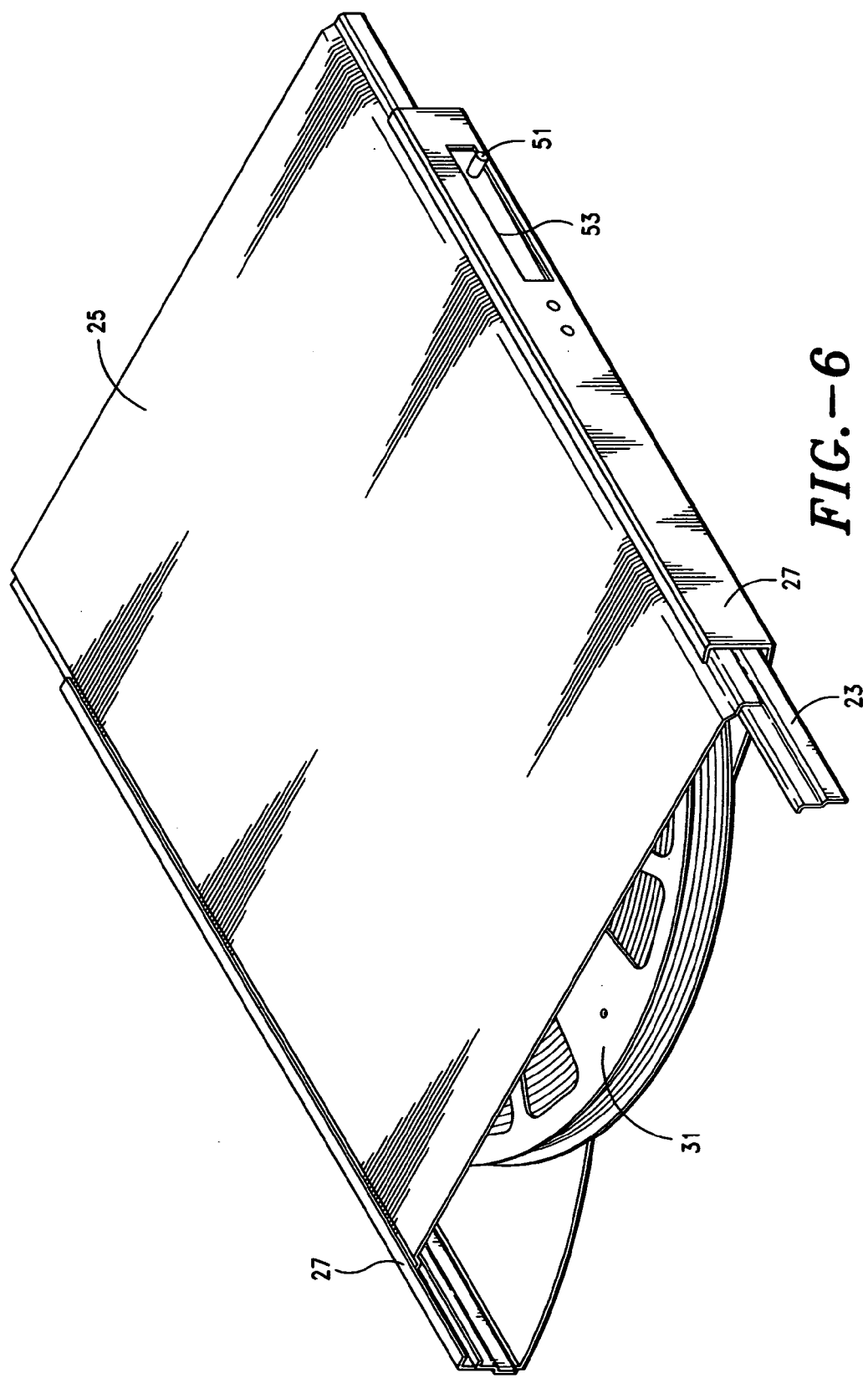

FIBER OPTIC CABLE ENCLOSURE

BACKGROUND OF THE INVENTION

1. Field of the Invention

The present invention relates to an apparatus for storing data and telecommunication cables in storage cabinets for emergency deployment. Data and telecommunication transmission apparatus includes, among other things, hardwire or fiber optic cable transmission lines for transmitting electronic signals in a data stream. Hereafter, the use of the term telecommunications in this specification includes data transmission over the same signal transmitting infrastructure.

More particularly, the present invention relates to an enclosure or case for the storage of predetermined lengths of fiber optic telecommunication transmission cable on reels with connectors at the ends thereof so that the cables can be unreeled and patched together in an emergency to bypass either remotely or locally located inoperative equipment at a telecommunications switching center.

Still more particularly, the present invention relates to an enclosure or case for reels of lengths of fiber optic cable which can be stored in pre-existing cabinet racks forming an emergency depot of banks of stored fiber optic cables. The cables are of a predetermined length and can be linearly extracted from the cabinets which are of a specific configuration and size to fit into a specific sized receptacle.

Specifically, the present invention relates to a flat rectangular box of predetermined dimensions and front panel configuration forming an enclosure to meet a specific design criteria for mounting in pre-existing racks and having a specific capability of sliding horizontal reciprocating relation through an aperture having a fixed width and height formed in a faceplate of a vertical rack. The box contains a rotatable reel holding a maximum length of fiber optic telecommunications for the interior volume of an enclosure which can fit in the pre-existing racks. The cable mounted on the reel can be rapidly extracted in an emergency and utilized to bypass damaged or inoperative apparatus or equipment. A multiple of the enclosures are stacked in cabinets having receptacle racks for the enclosures creating an emergency response facility.

2. Description of the Prior Art

The use of storage enclosures for spare or reserve communications cables for the purpose of providing emergency connections in the event of equipment breakdown is known in the prior art in one form or another. In a substantial number of facilities, a specific design criteria has been adopted for racks which hold a plurality of flat rectangular drawers forming cable enclosures. However, despite the numerous designs, structures, and forms of the apparatus disclosed by and utilized in the prior art, which have been developed for the accomplishment of the specific objectives, purposes, and requirements of the adopted design criteria, for ready cable storage for emergency response and deployment, the devices, apparatus, and methods which have been heretofore devised and utilized to accomplish these goals consist basically of familiar, expected, and obvious combinations of configurations and arrangements of well-known apparatus which have substantial defects. They do not meet the requirements of the fixed parameters for these devices for reliable and efficient operation. This will become apparent from the following consideration of the closest known and relevant prior art.

Telecommunications transmission lines are an important part of the infrastructure of almost all of the developed countries in the world as well as most of even the under-developed countries. Any breakdown is tantamount to a catastrophe, and as a result, all data and telecommunications transmission companies require backup systems. This has become especially important in view of the terrorist threats to the United States as well as to other countries having terrorist communities. The telecommunications networks must be prepared to respond to external emergency situations apart from, and as well as, anticipated and unexpected breakdowns in the network itself. An operations service center containing switching and server equipment is an especially vulnerable hub of the telecommunications network.

In anticipation of these possible internal and external threats to the continuity of the network, certain facilities have been provided with banks of fiber optic cable reels of a predetermined configuration and design criteria containing an optimum preselected length of 50 meters of standard 48 fiber cable which can be quickly pulled out of storage to patch across either remotely or locally located inoperative equipment to keep the network interconnected. The presently employed equipment utilizes cable reels mounted in drawers, in the form of flat rectangle boxes, which are stored in banks of cabinet racks.

Connectors are secured to both ends of the fiber optic cable wound on the reels: the fixed end of the cable is usually connected to a receptacle on the faceplate of the enclosure and the free end of the cable to a remote receptacle or to another cable. The present standard in the art utilizes male and female industry-standard MTP connectors which employ precision guide pins to align the internal fibers of the cables to transmit the data stream. MTP connectors are coupled together inside an industry-standard MTP adapter which engages the connectors to hold the two ends of the connectors together in alignment. An adapter is a coupling receptacle and is usually mounted in a faceplate of an enclosure or it can free float where it interconnects two cables. The two mating connectors are plugged into an adapter from opposite sides of the faceplate or, if free floating, from the opposite ends of the adapter.

For deployment, the free end of a reel stored cable is positioned by an operator to project through the faceplate of an enclosure whereby it can be grasped and pulled to reel out the fixed length of cable from the enclosure. A multiple of the cables can be interconnected, patched, or jumpered to bypass the inoperative equipment or to interconnect remotely located equipment.

There are many problems with the present standardized design of the cable storage enclosures which were created initially to meet the design criteria. The prior art enclosures containing a full complement of cable are very heavy. For installation in a storage rack, it requires two persons to lift and hold a drawer in position so that securement screws can be set at the corners to fix the drawers in the rack. The drawers are provided with ball bearing slides which are secured in the cabinet by the corner screws. The drawers can be partially slid out of the racks on these slides in order to rewind the cables onto the reels after they have been deployed in an emergency or alternatively for testing, repair, or inspection. The drawers can also be partially slid out to provide access to the cable for commencing deployment.

The construction of the cable reels of the prior art design is comprised of two metal disks which are separated by central standoff pins forming a segmented circle in the center of the reel. The problem with using the standoff pins, which presumably was employed as the simplest or cheapest form of construction, is that if the cable is wound to tightly on the reel, the cable is bent sharply around each standoff pin, and that can cause fiber breakage in the fiber-optic cable.

The cable reels are mounted in the drawers on lazy susan turntables which are secured to the bottoms of the boxes under the reels which hold the fiber optic cable. The lazy susan supports the reel and allows it to turn freely to wind and unwind the cable onto or from the reel. Unfortunately, the lazy susan also allows the reel to continue turning after tension on the cable, utilized for pulling it off the reel, has ceased or abated thereby permitting the layers of cable to loosen within the reel. This effect cannot be reversed without pulling further cable off the reel until the slack has been removed and then the cable rewound. No mechanisms have been designed for incorporation into the enclosures to cure this problem.

The side mounted drawer slides narrow the width of the drawer, and the height of the lazy susan in the drawer reduces the width of the reel which can be put in the drawer, whereby these devices occupy storage space in the allotted drawer space or volume, and the 50 m designated lengths of fiber optic cable cannot all fit onto the standard reels. The excess must be gathered and tucked into the corners of the box, and velcro straps are used to hold the excess cable tightly in the remaining space. As a result, the cable cannot be quickly reeled from the front faceplate of the box as designed: the drawer must be slid out of the rack and opened to access the tied sections of cable, and release them, in order to extract the excess cable from the corners before the rest of the cable can be pulled off of the reel through the faceplate. Thus, the enclosures do not function as designed.

Apart from the design problems, there are numerous operational problems which have become apparent which essentially are also design problems. In addition to the lack of cable storage volume in the drawer, caused by the presence of the drawer slides and the lazy susan, the space between the peripheral edges of the reel and the sides of the enclosure has been such that the outer layer of cable will jam in between the reel sides and the enclosure side panels during rewinding because not all of the cable will fit on the reel. This causes compression of the cable when the cable is wound too tightly onto the reel trapping it between the wound cable and the side panels and thereby possibly causing crushing and damage to the individual fibers. The wedging also causes the cable to stick between its own layers and or the sides of the reels, as well as the sides of the enclosure, and prevents the cable from unwinding freely if it has been wound up too tight. As a heavy reel continues turning pass the point of jam, because angular momentum of the lazy susan allows continued rotation of the heavy reel, tension applied to the cable by pulling on it can jerk the cable out of the jam point and back bend the internal fibers in a direction opposite to its initial wind direction thus causing the back bend and possible fractures in the cable fibers.

The primary problem is that the design does not permit the storage drawers to function as intended. The cable cannot be pulled out of the drawer by the projecting cable pulling eye connector on the free end of the cable when it is disposed or positioned within the enclosure front panel because the drawer must be opened to permit the cable tucked into the each of corners to be released and fed out through the front aperture before it can be pulled off the reel as designed. More of a problem, however, is the fact that the cable tucked into the corners is subjected to severe bending which could cause the individual fibers in the fiber-optic cable to crack or fracture. This is a severe operational defect which could render the cables partially if not wholly inoperative. Making the drawers larger is not an option because the cabinet racks are existing installations in the facilities. Likewise, storing less than the optimum 50 m length of 48 fiber cable on the reels renders the emergency design unusable. All of the parameters of the design are laid out based on 50 m patch cable lengths to create inoperative equipment bypasses and network interconnects.

The prior art enclosure design has a locking pin mechanism wherein a spring-loaded locking pin is mounted in the box and secured to the lower side plate of the reel by a screw. The pin is formed to project through the cable reel bottom surface to engage a hole in the bottom surface or pan of the drawer. When the pin is engaged with both the reel and the enclosure, it locks up the cable reel and prevents it from rotating in either direction. Due to the play inherent in the bearings of the lazy susan, combined with an insufficient space for an adequate length of pin for positive engagement, the pin does not always engage both holes, thus preventing continuous positive lock up of the reel.

The standard design of the storage racks for containing the prior art reel enclosures is such that the rectangular flat drawers are oriented horizontally and the reels lie flat in the storage racks with their axes of rotation oriented vertically. As a result, gravity affects winding of the cable on the reels whereby it is biased to collect on the lower reel wall or plate until tension on the cable causes it to climb up the wound cable and fill the reel. The presently existing prior art design has clearance of slightly more than ¼ inch under the reel due to the lazy susan. That space allows the cable to wind off the edge of the reel and slip under the reel lower plate and become wedged between the reel and the bottom pan of the drawer and jam thereunder and prevent the lazy susan and reel from turning to either wind or unwind the cable. It also has the effect of crushing the cable and damaging the individual fibers.

To prevent the cable from winding out from the center of the spool, on the lower side wall of the reel, and off the lower outer edge of the reel before it is full, the prior art has employed two rollers mounted in the drawers at the edges of the cable reel to keep the cable from pushing out and around the edges of the reel in the corners of the drawer and dropping down and slipping under the bottom panel of the reel in the vertical space necessitated by but unoccupied by the lazy susan. The two rollers are provided set 180 degrees apart in the corners of the drawers and against the edges of the reel. Since not all the cable will fit on the reel, binding of the cable between two rollers and the cable already wound on the reel can occur when the reel is full but before all of the cable is wound on the reel. Damage to the cable fibers occurs if one continues to forcefully wind the cable on the reel. The roller guides are an expensive and unnecessary correction for a problem which should not exist.

A rewind handle is provided with each enclosure which is held in the drawer by velcro straps on the inside thereof. It can be released and attached to the reel to enable rewinding of the cable onto the reel after the need for the cable to be extended in an emergency, or for repair, or after a test situation, has abated. The location of the attachment point for the handle to the reel is proximate the center of the reel for convenience but such that the mechanical advantage is at a minimum. The force required to rotate the reel is unnecessarily excessive, and there is no feedback to the operator or feel as to how tight the cable is being rewound onto the reel. Thus, the cable can be caught on interfering surfaces and projections throughout the cable path during rewind. In such circumstances, when the cable is snagged during rewind, and the operator continues the rewind process, a kink or excessive tension on the cable can cause damage to the cable.

The cable reel enclosure contemplated according to the present invention departs substantially from the conventional concepts and engineering design taught and employed by the prior art to meet the established design criteria. In doing so, the present invention provides an apparatus primarily developed for the purpose of increased utility and functionality to overcome the problems described above and to improve upon the design in such a manner as to comprise a new and unobvious enclosure unit which fully satisfies the initial design parameters. It accomplishes the result in a different and improved manner thereby producing a more versatile reel enclosure which is also lighter and less expensive to manufacture. The enclosure of the present invention more accurately achieves the desired functions of the apparatus and accomplishes the specific original objectives for an installed emergency fiber optic cable storage enclosure without jamming of the cables during extraction or the need to release the corner cable collections before extracting the cable.

The new design can also be used in more permanent applications where there is an unknown cable length or connector type required: e.g., where office equipment needs to be relocated easily; where there is a need for "reusable" cable; in trade show booths and emergency restorations; or anywhere untrained labor will install the cable.

SUMMARY OF THE INVENTION

In view of the foregoing known, obvious, and described disadvantages inherent in the presently existing types of cable reel enclosures disclosed by the prior art, the present invention provides a new method, apparatus, and design of construction for an improved everyday, special application, or emergency fiber optic cable reel enclosure, wherein the same can be utilized to more perfectly perform its function. The reel system can also be used for non-emergency deployment.

The general purpose and function of the present invention, which will be described hereafter in greater detail, is to provide a new and improved emergency fiber optic cable storage enclosure which has many of the advantages of the prior art of cable reel enclosures mentioned and described above, and many novel features and advantages that result in a new emergency fiber optic cable enclosure for adoption, which meets the existing design criteria and is not anticipated, rendered obvious, suggested, or even implied by any of the prior art of cable reel enclosures heretofore known, either alone or in any combination thereof.

The present invention is a telecommunications and data transmission fiber optic cable enclosure for providing the maximum internal volume therein for housing a cable storage reel in an enclosure which must fit in sliding horizontal reciprocating relation through an aperture having a fixed width and height formed in the front surface of a pre-existing vertical rack. It is comprised of a rectangular box enclosure having at least a flat bottom pan, two side panels, a rear panel, and a front panel face plate. The side panels have a height, and the rear panel has a height and width, small enough to fit through the aperture in the front surface of the rack.

The side panels of the enclosure have the exterior surfaces thereof formed for engaging shelf rails in the form of C section members forming slide channels secured to a rack and formed for receiving the side panels of the enclosure in a horizontal sliding reciprocating relation in a vertical stack of enclosures.

A cable reel is disposed for rotation in the enclosure with a vertical axis of rotation. The periphery thereof is positioned in close relation to at least the side panels thereof. The reel has a pair of horizontally oriented parallel side plates mounted on opposite sides of a central circular hub. The reel has a multiple of low-rise protuberances formed around the hub at least on the lower plate exterior surface of the reel. As a result, the reel rests in the enclosure on the bottom pan and rotates thereon on the protuberances. The clearance between the pan and the lower reel plate is minimal and considerably less than the diameter of the cable to be wound on the reel, and the width of the hub between the reel plates is maximized within the enclosure between the top surface plane of the box and the bottom pan. A predetermined length of fiber optic cable can be wound thereon without excess thereof being stored in the corners of the enclosure and without fracturing the internal fibers of the cable by being wound thereon with too acute of an angular bend around the hub.

At least one coupler is secured to a first or fixed end of a cable disposed proximate to the central hub of the reel when cable is wound on the reel around the hub. The coupler is formed to engage a receptor disposed in the face plate of the enclosure. The opposite end of the cable from the first fixed end is a second or free end of the cable and has a coupler secured thereto for engaging a remotely located receptor.

At least one receptor is disposed in the faceplate panel for receiving male and female couplers. An opening is formed in the faceplate panel within which the second free end of the cable can be disposed for extraction therethrough.

A locking means is provided which is actuated by a lever pivoted in the faceplate for engaging the shelf rails selectively.

The more important features of the invention have been broadly outlined in the preceding summary of the invention in order that the detailed description thereof which follows may be better understood and in order that the present contribution to an improvement in the art may be better appreciated. There are additional features of the invention that will be described hereinafter and which will form the subject matter of the claims appended hereto.

With respect to the claims hereof, and before describing at least one preferred embodiment of the invention in detail, it is to be understood that the invention is not to be limited in its application to the details of construction and to the arrangements of the components which are set forth in the following description or illustrated in the accompanying drawings. The invention is capable of being created in other embodiments and of being practiced and carried out in various ways. Also, it is to be understood that the phraseology and terminology employed here are for the purpose of description and should not be regarded as limiting.

As such, those skilled in the art in which the invention is based will appreciate that the conception upon which this disclosure is predicated may readily be utilized as a basis for the designing of other forms, structures, apparatus, systems, and methods for carrying out the several purposes of the present invention. It is important, therefore, that the claims be regarded as including such equivalent constructions in so far as they do not depart from the spirit and scope of the present invention.

Further, the purpose of the appended abstract is to enable the United States Patent and Trademark Office, and the public generally, and especially scientists, engineers and practitioners of the art who are not familiar with the patent and legal terms or phraseology, to determine quickly from cursory inspection the nature and essence of the technical disclosure of the application. The abstract is neither intended to define the invention of the specification, which is measured by the claims, nor is it intended to be limiting as to the scope of the invention in any way.

OBJECTS OF THE INVENTION

It is therefore an important object of the present invention to provide a new and improved telecommunication cable reel storage enclosure which meets the existing design criteria for a specific size and configuration of the enclosure for a predetermined length of cable for permanent installation, or emergency use, and which improves on the prior art devices provided for the same purpose.

It is another object of the present invention to provide a lighter-weight cable reel enclosure than the prior art for installation in a pre-existing cabinet rack forming a bank of such cable storage enclosures of a specific predetermined enclosure size and cable length capacity or which can stand alone without being installed in a cabinet rack by being placed on a supporting surface and utilized in the same manner as if installed in a rack.

It is a further object of the present invention to provide a cable reel enclosure which is comprised of a minimum of lightweight parts which is less expensive to manufacture and easier to install and does not need to have cable released from the corners thereof to extract the cable therefrom for response to emergency situations.

It is still another object of the present invention to provide a cable reel enclosure which fits in a standard bank/rack of pre-existing cable reel enclosures and dispense and retract fiber optic cable from and onto a reel with jam free operation during cable extraction and retraction.

It is still a further object of the present invention to provide a cable enclosure which can fit through an aperture of a fixed width and height in sliding reciprocating relation and provide a maximum internal volume for a cable reel contained therein.

And it is yet another object of the present invention to provide an enclosure for a cable reel which has a brake on the reel during cable extraction which prevents the wound cable from loosening on the reel when extraction tension on the cable is released.

Other objects and advantages of the present invention will become apparent when the method and apparatus of the present invention are considered in conjunction with the accompanying drawings.

DESCRIPTION OF THE DRAWINGS

FIG. 4 is a side elevation view of the cable reel extracted from the enclosure with cable wound thereon and showing the MTP connectors on a free end thereof;

FIG. 5 is a detailed view of the locking mechanism which holds the enclosure in the cabinet rack; and FIG. 6 is a detailed view of the top cover sliding engagement mechanism with the enclosure and of the engagement of the side panels of the enclosure with the slide channels on the supporting racks.

DESCRIPTION OF THE PREFERRED EMBODIMENT

Reference is made to the drawings for a description of the preferred embodiment of the present invention wherein like reference numbers represent like elements on corresponding views.

Figure 1:
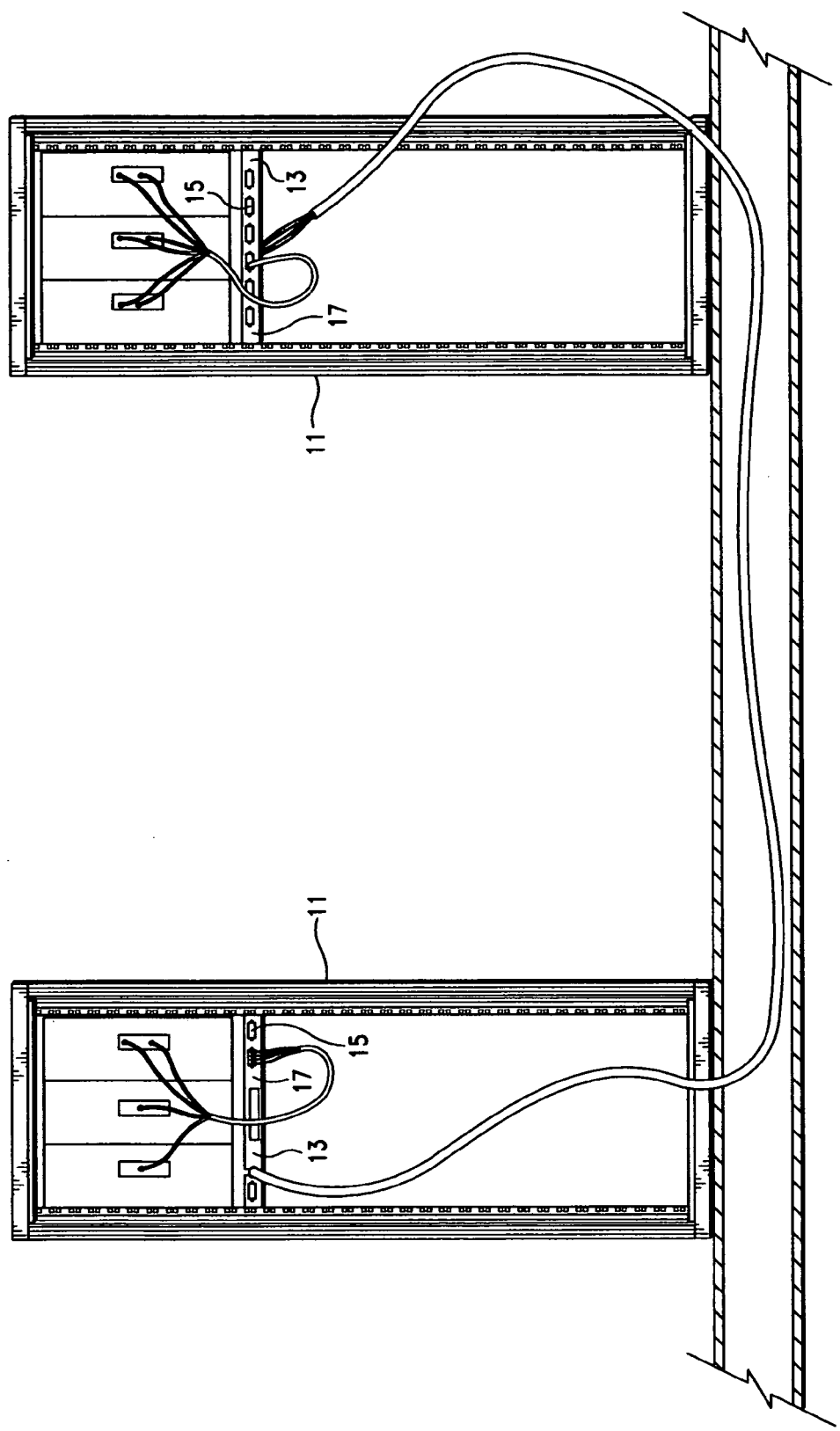
FIG. 1 is a diagrammatic front elevation of a pair of racks which support a number of enclosures of the present invention for emergency cable storage reels.

FIG. 1 shows a diagrammatic representation of the environment of the present invention which is a telecommunications and data transmission operations service center containing switching and server equipment.

Thereshown is a pair of cabinet racks 11 each containing a representative set of equipment. The present invention is a fiber optic cable enclosure 13 that is formed for providing the maximum internal volume therein for housing a cable storage reel in an enclosure which must fit in sliding horizontal reciprocating relation through or within an aperture having a fixed width and height formed in the front surface of a vertical rack. However, in actual operation, each of the racks contains a multiple of enclosures in a vertical stack. In a service facility, the spare cable enclosures, or cases, each contain 50 meters, optimum length, of fiber optic 48 fiber cable. The enclosures are essentially identical in that they fit in series in the racks and contain a cable reel which has a vertical axis of rotation and provide one or more cable connection receptacles 15 in the faceplates thereof for interconnection of the cables.

Figure 2:
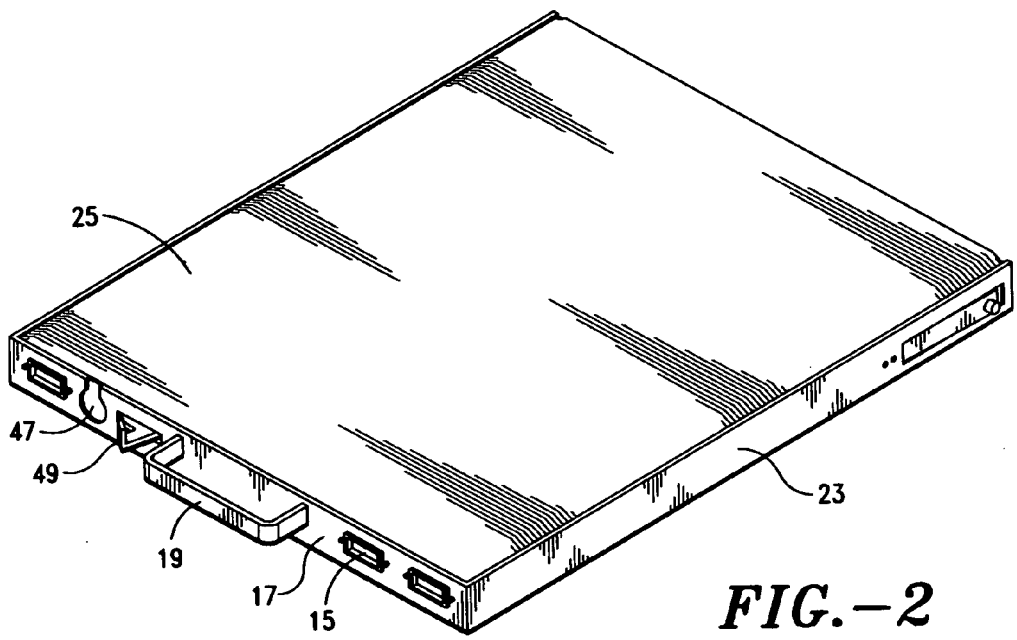
FIG. 2 is a perspective view of an individual cable reel enclosure of the present invention extracted from a support rack and with the cover closed.

Reference is made to FIG. 2 of the drawings which is a perspective view of an individual cable reel enclosure 13 or case removed from a support rack. The only exposed portions of the cable enclosures in the racks 11 are the front panel faceplates 17 which are aligned in horizontal rows and which may have company indicia imprinted thereon for identification and implementation purposes. The front faceplate can be provided with a control handle 19 for pulling, pushing, or carrying the enclosure. A multiple of receptacles 15 are provided therein for alternative modes of cable interconnection. At least one receptacle is needed to permit the internal first or fixed end of the stored cable to be connected to the faceplate. In operative condition, a free or second end of the internally stored cable is positioned to project through the faceplate with a pulling eye which can be grasped by an operator to extract the desired length of stored cable from the enclosure for connection to a remote receptacle or another cable end.

The enclosure 13 of the present invention is a rectangular nearly square box having a flat bottom pan 21, two side panels 23, a rear panel 25, and a front faceplate 17. The rear panel and the side walls are of a size to permit the enclosure to fit in the vertical opening in the front of the rack 11, for present purposes called the aperture. The faceplate of the enclosure is formed to essentially fill an aperture in a rack. The enclosures are approximately 21 inches long by 17 inches wide by 1.6 inches in height, and they fit through or into apertures formed in front surface of the rack which have specific fixed width and height dimensions.

Figure 3:
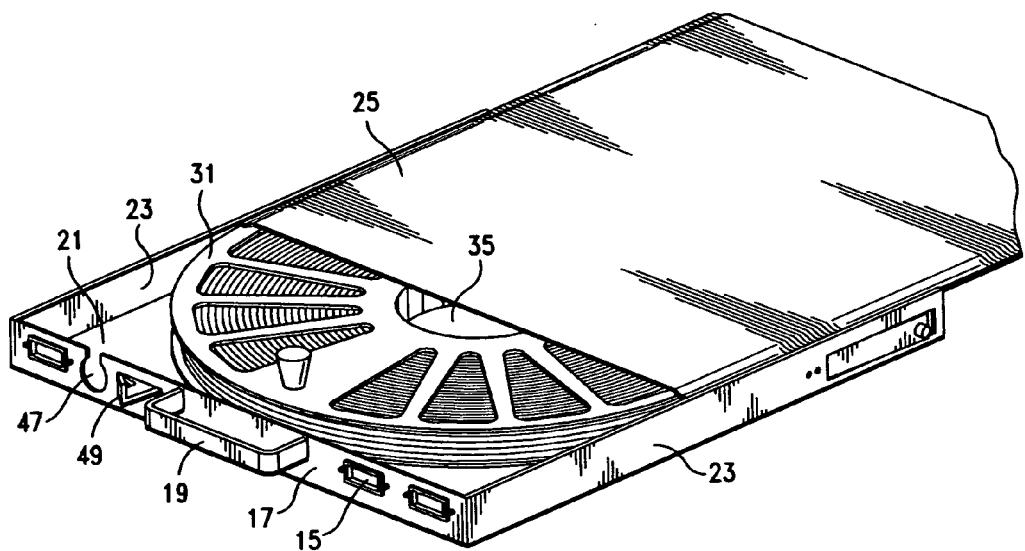
FIG. 3 is an alternative view of FIG. 2 with the top cover partially slid open.

Reference is made to FIGS. 3 & 6. In the preferred embodiment of the invention, a top cover 25 is provided which is secured to the enclosure 13 in a manner to permit it to be selectively opened to expose the interior of the enclosure. In the preferred embodiment of the invention, the cover is engaged in sliding relation with the top edges of the side walls 23 of the enclosure to permit the cover to reciprocate open and closed in a horizontal sliding relation. Alternatively, to having a sliding engagement to the box portion of the enclosure, the cover could be hinged to the top edge of the box or simply be removable therefrom.

Reference is made to FIG. 6. Thereshown is an enclosure 13 with the front panel or faceplate removed to show the engagement of the enclosure with the support rack. The side panels 23 on the enclosure 13, and the exterior surfaces thereof, are formed for engaging, in sliding relation, shelf rails which are secured to a rack (shown in FIG. 1) and formed for supporting a single enclosure for intermittent horizontal sliding reciprocating relation in one of the rack apertures in a vertical stack of enclosures. The shelf rails forming the supports for the enclosures can be simply a pair of single flat horizontal surfaces formed on or secured to the opposite internal side walls of a rack aperture and extending rearwardly in the enclosure thereof, on each side of the aperture from proximate the front surface, a sufficient distance to adequately support the enclosures.

In the preferred embodiment of the present invention, the shelf rails are horizontally disposed opposing C section channel members 27 mounted internally of the rack stack rearward of the apertures and forming slide channels. The C sections open in opposing relation toward the rack cavity wherein the external edges or exterior side panel surfaces 23 of the enclosure can be captured between the top and bottom flanges of the C section and supported whereby the enclosure can be selectively actuated intermittently in horizontal reciprocating sliding relation thereto when it is not locked in position therein.

In the preferred embodiment of the invention, the top cover 25 is formed to engage the enclosure 13 in such a manner that it can be separated from the enclosure and yet has intermittent horizontal sliding reciprocating relation with the enclosure the same as the enclosure has with the supporting rack. The side panels of the enclosure have the exterior surfaces thereof formed for engaging the shelf rails, in the form of C section members, secured to a rack and formed for receiving the side walls of the enclosure in a horizontal sliding reciprocating relation in a vertical stack of enclosures. The top edges of the side panels are recessed away from the opposing surfaces of the C section members, respectively, a distance slightly greater than the thickness of the cover. The cover is provided with depending lateral flanges which project between and are captured between the top edges of the side panels and the opposing surfaces of the C section members in sliding relation.

FIG. 3 of the drawings is a perspective view of an individual cable reel enclosure 13 or case with the cover slid 25 back to expose the internal mechanism and with its retraction actuation handle knob 29 engaged with the enclosed reel 31. When an enclosure is partially pulled out of the support rack 11, for access or service, to its extended cantilevered projecting position, the top cover slides rearward as shown partially retracted. It slides in the two vertical slots formed at the top edges of the side panels of the enclosure formed by the top edges and the slide channels as described supra. The cover can be selectively engaged with the rack when it is installed therein whereby as the enclosure is slid out of the rack, the cover is actuated to slide backwards (with respect to the enclosure) concurrently with the forward motion on the enclosure out of the rack. The cover connection to the cabinet can be manually released so that the cover can be removed with the enclosure when it is taken out of the rack.

A cable reel 31 is disposed for rotation in the enclosure 13 with a vertical axis of rotation whereby it can rotate with predetermined peripheral spacing from the walls of the surrounding enclosure. The periphery thereof is positioned in close relation to at least the side panels 23 of the enclosure which prevents the cable from slipping over the peripheral edge of the reel and attempting to wedge itself under the bottom surface of the reel, like the prior art, which would cause it to jam against rotation.

Reference is made to FIGS. 3 & 4. The circular reel 31 has a pair of horizontally oriented parallel side plates 33 or disks mounted to opposite sides of a central circular hub 35. The side walls of the reel are perforated to lessen the weight of the reel similar to a film reel. The reel has a multiple of low rise protuberances 37 formed around the hub, and projecting downward, at least on the exterior surface of the lower plate of the reel. As a result, the reel rests in the enclosure and rotates on the flat bottom pan 21 on the protuberances. The protuberances formed on the bottom side of the lower plate of the reel support the plate at a minimum distance from the top surface of the bottom pan of the enclosure to reduce the area of surface to surface contact between lower reel plate and the pan and whereby the clearance between the pan and the lower reel plate is minimal and considerably less than the diameter of the cable wound on the reel.

By eliminating a lazy susan of the prior art for supporting the reel 31, and keeping the clearance between the bottom pan 21 and the lower reel plate at a minimum, the distance between the reel plates 33, or the width of the hub 35 which interconnects the plates, is maximized within the enclosure 13 between the top surface plane of the box, formed by the cover 25, and the bottom pan whereby a predetermined length of fiber optic cable can be wound thereon without excess cable being stored in corners of the enclosure. This prevents the possibility of fracturing the internal fibers of the cable by extreme bending of the cable which might occur if the cables are gathered and bent in small sections to be secured by velcro straps in the corners of the enclosure at the periphery of the reel as is necessary with the prior art.

The reduced area of contact between the lower reel plate 33 and the bottom pan 25 substantially reduces the friction therebetween. This arrangement permits the reel 31 to rotate reasonably freely on top of the bottom pan, but at a very close spacing therefrom and without a lazy susan, when cable is pulled from the enclosure. However, there is sufficient friction remaining between the bottom surface of the reel and the pan to act as a brake on the cable for purposes of braking angular momentum during unwinding or extraction of the cable from the enclosure when tension on the cable is relaxed. The reel does not free wheel in rotation due to angular momentum like the prior art cable reels mounted on lazy susans.

In the preferred embodiment of the invention, the reel 31 has a machined hub 35 of a sufficient diameter around which the fiber optic cable can be wound without severe bending which could result in the breaking of the individual fibers in the cable as is possible with the hub construction of the prior art. This means that the diameter of the hub must be such that the degree of bending of the cable as it is wound around the hub is not to such an acute angular bend that it causes the internal optical fibers to fracture. The diameter of the hub varies depending upon the size of the cable installed on the reel and in the present invention is five (5) inches or greater for standard 48 fiber cable. While the present invention is designed to hold 50 m of 48 fiber cable, as it is presently available in the marketplace, as much as 200 m of cable might be wound on the reel with a lesser fiber count cable.

At least one coupler 39 is secured to a first or fixed end 41 of the cable disposed proximate to the central hub 35 of the reel when the cable is wound on the reel around the hub. The coupler is formed to engage a receptor 15 disposed in the faceplate 17 of the enclosure 13. The opposite end of the cable from the first fixed end is a second or free end 43 of the cable and has a coupler 45 secured thereto for engaging a remotely located receptor. In the preferred embodiment of the invention, the industry utilizes male and female MTP connectors as couplers and MTP adapters as receptors. The hardware could change with time and serve the same function.

At least one industry standard connector is secured to a first or fixed end of the cable disposed proximate to the central hub of the reel when cable is wound on the reel around the hub. The connector is formed to engage an industry standard adapter disposed in the panel faceplate of the enclosure. The opposite end of the cable from the first fixed end is a second or free end of the cable and has at last one industry standard connector end formed thereon for engaging a remotely located second industry standard adapter.

At least one industry standard adapter is disposed in the panel faceplate for receiving male and females industry standard connectors, and there is an opening in the panel faceplate through which the second free end of the cable can be disposed for extraction therethrough.

At least one receptor is disposed in the faceplate panel 17 for receiving male and female couplers. Additional receptors are usually provided in the faceplate to permit jumping the enclosure. An opening 47 is positioned in the faceplate panel within which the second or free end 43 of the cable can be positioned with respect thereto for extraction therethrough. In practice, the opening is like an inverted keyhole or slot which the cable is dropped into when the enclosure has been opened for deployment.

Reference is made to FIGS. 5 & 6. A locking means is provided which is actuated by a lever 49 pivoted in the faceplate 17 for engaging the shelf rails 27 selectively. It is comprised of a pair of laterally projecting pins 51 having a first biasing means for effecting engagement of the pins with a slot 53 in the shelf rail/slide channels 27. The locking means has an actuation means for selectively retracting the pins from engagement with the shelf rail/slide channels and includes a second biasing means which is formed to counteract the first biasing means and hold the locking pins out of engagement with the shelf rail/slide channels. The biasing means in the preferred embodiment of the present invention are opposing tension flat springs 55. The actuating lever 49 disposed in the faceplate 17 of the enclosure 13 is part of an internal cam to which is attached a jacketed pull cable 57. Other actuating mechanisms than a lever could actuate the pull cable such as a button or pull chain. Friction in the cable jacket assists the biasing means in holding the locking pins in the selected position.

Actuation of the lever 49 rotates the cam 59 and retracts the pull cable 57 which is routed to the rear of the enclosure 13 and attached to one of two C channels 61 nested together which can slide in relation to each other. The jacket of this cable is attached to the other C channel. Pulling the cable thus pulls one C channel toward the center of the enclosure while the jacket pulls the other C channel toward the center. The outboard ends of each C channel are attached to flat biasing springs 55 and retract the flat springs away from the sides 23 of the enclosure toward the center of the enclosure. The projecting pins 51 are attached perpendicularly to the springs and thus are retracted inward away from the slide rails 27, along with the springs, which disengages the pins from the slide rails.

Reference is again made to FIG. 3. A removable reel actuation handle is provided within the case for providing manual rotation of the reel to wind cable on to the reel. The handle is positioned within the enclosure and secured thereto until it is removed for engagement with the reel. In the preferred embodiment of the invention, the handle is provided with a threaded stud which screws into a threaded receptacle in one of the corners of the enclosure. A threaded receptacle is also provided proximate to the periphery of the reel which can receive the threaded stud on the handle whereby when it is engaged therewith, the handle can be grasped by an operator to rotate the reel. Thus, the handle can alternatively be stored in the threaded hole in a corner of the enclosure or removed and engaged with the reel top plate for rotation thereof.

The Operation of the Apparatus

The enclosure 13 is pulled partially out from the rack 11 to expose the free or second end 43 of the cable residing in the enclosure which is the external end of the output cable. It is extracted from the enclosure and the cable positioned in the slot in the faceplate. The required length of cable is pulled from the reel to reach to the destination. This free second end of the cable, which has been extracted from the enclosure, is either coupled into a termination panel or plugged into a receptor on another cable reel enclosure or to a patch panel to extend the circuit.

After the second or free end 43 of the cable has been reeled out the desired length, the first or internal fixed end 41 of the cable is plugged into a receptor 15 disposed in the faceplate 17 on the enclosure. This first end is the fixed or opposite end of a cable which is secured within the central hub when the cable is wound on the reel. It has a coupler end 39 formed thereon for engaging a receptor 15. The cables are usually simply unwound to the extent of their length and then the fixed first (internal) end is connected to the coupling receptor in the enclosure faceplate. The cable is wound on to the reel leaving a loose end length in the center thereof whereby when the reel is fully (or partially) unwound, the fixed end can be plugged directly into the back of a receptor in the faceplate to permit the enclosure cable to become active by an input line being connected to the fixed end of the cable through the faceplate receptor.

Advantages of the Improvements Effected by the Present Invention

The prior art devices were drawers secured in a rack which fixed their operation in place. The present invention is a stand alone unit capable of functioning from any flat surface, or it can be stored in vertical racks like the prior art, in the apertures vacated by the prior art, and easily removed therefrom.

The protuberances on the bottom of the reel face reduce the area of contact between the lower reel plate and the bottom pan thereby substantially reducing the friction therebetween. This arrangement permits the reel to rotate reasonably freely on top of the bottom pan but at a very close spacing therefrom without the cost of, and loss of space caused by, a lazy susan. However, there is sufficient friction remaining between the bottom surface of the reel and the bottom pan to act as a brake on the cable for purposes of braking angular momentum during unwinding or extraction of the cable from the enclosure when tension on the cable is relaxed. It does not free wheel in rotation due to angular momentum like the prior art reels mounted on lazy susans.

The protuberances formed on the bottom side of the lower plate of the reel support the plate at a minimum distance from the top surface of the bottom pan of the enclosure. This reduced distance between the pan and the reel, which is effected by eliminating the lazy susan, works in conjunction with the close tolerances of the reel with the side walls of the enclosure. These close tolerances inhibit cable from spilling off the reel, but the close spacing between the reel and the pan effected by the protuberances prevents cable which does spill off of the edge of the reel from wedging between the lower surface of the reel and the top surface of the bottom pan of the enclosure as happens with the prior art.

The replacement of the ball-bearing drawer slides by C section channels, to permit the intermittent horizontal reciprocating relation, save considerable cost of manufacture and weight in the enclosure, but, most importantly, the elimination of the slides permits more internal volume in the enclosure for the cable reel thereby increasing the capacity of the enclosure to store cable.

The replacement of the lazy susan of the prior art by the protuberances has several significant beneficial effects. Like the elimination of the ball bearing drawer slides, the first is to reduce the weight of the enclosure but more importantly it substantially reduces the cost of manufacture. Still more important is the fact that it allows the width of the cable reel to be expanded by at least the thickness of the lazy susan thereby likewise increasing the capacity of the reel to hold fiber optic cable. This increase in dimension is sufficient to allow the width of the reel between the plates to be maximized within the enclosure between the top cover and the bottom pan. These increases, due to the elimination of the drawer slides and the lazy susan, have proven to be sufficient to allow all 50 meters of fiber optic 48 fiber cable to be freely wound on the reel without crushing or binding. It allows all of the 50 meters of cable to be wound on the reel without excess thereof having to be stored in the corners of the enclosure like the prior art. This improvement overcomes two of the most serious problems with the prior art: the possibility of breaking fibers in the cable due to bending and crushing of the cable to store it in the corners of the enclosure and the jamming of the cable between the reel bottom plate and the pan of the enclosure which causes great delay to clear.

Thus, it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

We claim:

1. A telecommunications and data transmission fiber optic cable storage enclosure for providing the maximum internal volume therein for housing a cable storage reel in an enclosure which must fit in sliding horizontal reciprocating relation through an aperture having a fixed width and height formed in a front surface of a pre-existing vertical rack, said enclosure comprising a rectangular box enclosure having a flat bottom pan, two side panels, a rear panel, and a front panel faceplate, said side panels having a height, and said rear panel having a height and width, small enough to fit through said aperture in said front surface of said rack, said side panels of said enclosure having the exterior surfaces thereof formed for engaging shelf rails in the form of C section members forming slide channels secured to said rack and formed for receiving said side panels of said enclosure in a horizontal sliding reciprocating relation said rack, a cable reel disposed for rotation in said enclosure with a vertical axis of rotation and the periphery thereof being positioned in close relation to at least said side panels thereof, said reel having a pair of horizontally oriented parallel side plates mounted on opposite sides of a central circular hub, said reel having a multiple of low-rise protuberances formed around said hub at least on the a lower plate exterior surface of said reel whereby said reel rests in said enclosure on said bottom pan and rotates thereon on said protuberances, and further whereby the clearance between said bottom pan and the lower of said reel side plates is minimal and considerably less than the diameter of the cable to be wound on said reel and still further whereby the width of said hub between said plates is maximized within said enclosure between the top surface plane of said box and said bottom pan, and still further whereby a predetermined length of said cable can be wound thereon without excess thereof being stored in the corners of said enclosure and without fracturing the internal fibers of said cable by being wound with too acute of an angular bend around said hub, at least one coupler being secured to a first or fixed end of said cable disposed proximate to said central hub of said reel when cable is wound on said reel around said hub, said coupler being formed to engage a receptor disposed in said panel face plate of said enclosure, the opposite end of said cable from said first fixed end being a second or free end of said cable and having a second coupler secured thereto for engaging a remotely located receptor, at least one receptor disposed in said panel faceplate for receiving male and female couplers and an opening in said panel faceplate within which said second free end of said cable can be disposed for extraction therethrough, and a locking means actuated by a lever pivoted in said faceplate for engaging said shelf rails selectively.

2. The enclosure of claim 1 wherein said locking means is comprised of a pair of pins projecting laterally from said side panels and has a first biasing means for engaging with said pins with said shelf rails, said locking means having actuation means for selectively retracting said pins from engagement with said shelf rails and including a second biasing means to counteract said first biasing means to hold said locking means out of engagement with said shelf rails.

3. The enclosure of claim 1 wherein said shelf rails are formed of C section members secured to said rack and formed to receive said side walls of said enclosure therein for sliding horizontal movement with respect thereto.

4. The enclosure of claim 1 including a top cover secured to said enclosure in a manner to permit it to be selectively opened to expose the interior of said enclosure.

5. The enclosure of claim 4 wherein said top cover is engaged with the top edges of said side panels of said enclosure in sliding relation to permit said cover to reciprocate open and closed in a horizontal sliding relation.

6. The enclosure of claim 5 wherein the top edges of said side panels are recessed away from the opposing surfaces of said C section members, respectively, a distance slightly greater than the thickness of said cover, and said cover is provided with depending lateral flanges which project between and are captured between said top edges of said side panels and said opposing surfaces of said C section members in sliding relation.

7. The enclosure of claim 1 wherein said couplers are male and female mechanical transfer protocol industry standard connectors and said receptors are mechanical transfer protocol industry standard adapters.

8. A telecommunications and data transmission fiber optic cable enclosure for providing the maximum internal volume therein for housing a cable storage reel in an enclosure which must fit in sliding horizontal reciprocating relation through an aperture having a fixed width and height formed in the front surface of a pre-existing vertical rack, said enclosure comprising a rectangular box enclosure having a flat bottom pan, a top cover, two side panels, a rear panel, and a front panel face plate, said side panels of said enclosure having the exterior surfaces thereof formed for engaging shelf rails in the form of C section members secured to said rack and formed for receiving said side panels of said enclosure in a horizontal sliding reciprocating relation said rack, said side panels having the top edges thereof being recessed away from the opposing surfaces of said C section members on said rack, said cover being provided with depending lateral flanges which project between and are captured between said top edges of said side panels and said opposing surfaces of said C section members in sliding relation to permit said cover to reciprocate open and closed in a horizontal sliding relation whereby it can be opened to expose the interior of said enclosure, said side panels having a height, and said rear panel having a height and width, small enough to fit through said aperture, a cable reel disposed for rotation in said enclosure with a vertical axis of rotation and the periphery thereof being positioned in close relation to at least said side panels thereof, said reel having a pair of horizontally oriented parallel side plates mounted on opposite sides of a central circular hub, said reel having a multiple of low-rise protuberances formed around said hub at least on the lower plate exterior surface of said reel whereby said reel side rests in said enclosure on said bottom pan and rotates thereon on said protuberances, and further whereby the clearance between said bottom pan and the lower of said reel plates is minimal and considerably less than the diameter of the cable to be wound on said reel and still further whereby the width of said hub between said plates is maximized within said enclosure between said top cover and said bottom pan, and still further whereby a predetermined length of fiber optic cable can be wound thereon without excess thereof being stored in the corners of said enclosure and without fracturing the internal fibers of said cable by being wound with too acute of an angular bend around said hub, at least one industry standard connector being secured to a first or fixed end of said cable disposed proximate to said central hub of said reel when cable is wound on said reel around said hub, said connector being formed to engage an industry standard adapter disposed in said panel face plate of said enclosure, the opposite end of said cable from said first fixed end being a second or free end of said cable and having at last one industry standard connector end formed thereon for engaging a remotely located second industry standard adapter, at least one industry standard adapter disposed in said panel faceplate for receiving male and female industry standard connectors and an opening in said panel faceplate through which said second free end of said cable can be disposed for extraction therethrough, a locking means actuated by a lever pivoted in said faceplate and comprising a pair of pins laterally projecting from said side panels and having a first biasing means for engaging said pins with said slide channels, said locking means having actuation means for selectively retracting said pins from engagement with said channels and including a second biasing means to counteract said first biasing means and hold said locking means out of engagement with said channels, and a removable reel actuating handle for engaging said reel proximate the periphery thereof and effecting manual rotation of said reel in said enclosure for winding cable onto said reel.

* * * * *